UNITED STATES PATENT OFFICE.

JOHN W. HYATT, JR., OF NEWARK, AND ISAIAH S. HYATT, OF MORRISTOWN, NEW JERSEY, ASSIGNORS, BY MESNE ASSIGNMENTS, TO THE CELLULOID MANUFACTURING COMPANY, OF NEW YORK.

TREATING AND MOLDING PYROXYLINE.

SPECIFICATION forming part of Reissued Letters Patent No. 10,469, dated April 15, 1884.

Original No. 105,338, dated July 12, 1870; Reissue No. 5,928, dated June 23, 1874. Application for reissue filed March 10, 1884.

*To all whom it may concern:*

Be it known that we, JOHN W. HYATT, Jr., of Newark, Essex county, New Jersey, and ISAIAH S. HYATT, of Morristown, Morris county, New Jersey, have invented a new and Improved Process of Dissolving Pyroxyline and of Making Solid Collodion, of which the following is a specification.

Our invention consists, first, of so preparing pyroxyline that pigments and other substances in a powdered condition can be easily and thoroughly mixed therewith before the pyroxyline is subjected to the action of a solvent; secondly, of mixing with the pyroxyline so prepared any desirable pigment, coloring matter, or other material, and also any substance in a powdered state which may be vaporized or liquefied and converted into a solvent of pyroxyline by the application of heat; and, thirdly, of subjecting the compound so made to heavy pressure while heated, so that the least practicable proportion of solvent may be used in the production of solid collodion and its compounds.

The following is a description of our process:

First. We prepare the pyroxyline by grinding it in water until it is reduced to a fine pulp by means of a machine similar to those employed in grinding paper-pulp.

Second. Any suitable white or coloring pigment or dyes, when desired, are then mixed and thoroughly ground with the pyroxyline pulp, or any powdered or granulated material is incorporated that may be adapted to the purpose of the manufacturer. While the ground pulp is still wet we mix therewith finely-pulverized gum-camphor, in about the proportions of one part (by weight) of the camphor to two parts of the pyroxyline when in a dry state. These proportions may be somewhat varied with good results. The gum-camphor may be comminuted by grinding in water, by pounding, or rolling; or, if preferred, the camphor may be dissolved in alcohol or spirits of wine, and then precipitated by adding water, the alcohol leaving the camphor and uniting with water, when both the alcohol and the water may be drawn off, leaving the camphor in a very finely-divided state. After the powdered camphor is thoroughly mixed with the wet pyroxyline pulp and the other ingredients, we expel the water as far as possible by straining the mixture and subjecting it to an immense pressure in a perforated vessel. This leaves the mixture in a comparatively solid and dry state, but containing sufficient moisture to prevent the pyroxyline from burning or exploding during the remaining process.

Third. The mixture is then placed in a mold of any appropriate form, which is heated, by steam or by any convenient method, to from 150° to 300° Fahrenheit, to suit the proportion of camphor and the size of the mass, and is subjected to a heavy pressure in a hydraulic or other press. The heat, according to the degree used, vaporizes or liquefies the camphor, and thus converts it into a solvent of the pyroxyline. By introducing the solvent in the manner here described and using heat to make the solvent active and pressure to force it into intimate contact with every particle of the pyroxyline, we are able to use a less proportion of this or any solvent which depends upon heat for its activity than has ever been known heretofore. After keeping the mixture under heat and pressure long enough to complete the solvent action throughout the mass, it is cooled while still under pressure and then taken out of the mold. The product is a solid, about the consistency of sole-leather, but which subsequently becomes as hard as horn or bone by the evaporation of the camphor. Before the camphor is evaporated the material is easily softened by heat, and may be molded into any desirable form, which neither changes nor appreciably shrinks in hardening.

We are aware that camphor made into a solution with alcohol or other solvents of camphor has been used in a liquid state as a solvent of xyloidine. The use of such solvents is described in Letters Patent of the United States No. 97,454, dated November 30, 1869, and issued to Daniel Spill for "improvement in dissolving xyloidine for use in the arts."

What we claim as our invention is—

1. The process of preparing pyroxyline, consisting of grinding the pyroxyline into a pulp, and after mingling therewith a solvent subjecting the mixture to heat and pressure, substantially as and for the purpose described.

2. The use of finely-comminuted camphor gum mixed with pyroxyline pulp, and rendered a solvent thereof by the application of heat, substantially as described.

3. The treatment of pyroxyline pulp containing camphor mixed therewith in a finely-divided condition by subjecting the same to pressure in molds and continuing the pressure until the mold and its contents are cooled, substantially as described.

New York, March 3, 1884.

JOHN W. HYATT, JR.
ISAIAH S. HYATT.

Witnesses:
CHAS. C. GILL,
HERMAN GUSTOW.